United States Patent [19]

Newkirk

[11] Patent Number: 5,010,044

[45] Date of Patent: * Apr. 23, 1991

[54] PROCESS FOR PREPARING SELF-SUPPORTING BODIES AND PRODUCTS PRODUCED THEREBY

[75] Inventor: Marc S. Newkirk, Newark, Del.

[73] Assignee: Lanxide Technology Company, LP., Newark, Del.

[*] Notice: The portion of the term of this patent subsequent to Dec. 5, 2006 has been disclaimed.

[21] Appl. No.: 446,321

[22] Filed: Dec. 5, 1989

Related U.S. Application Data

[63] Continuation of Ser. No. 296,773, Jan. 3, 1989, Pat. No. 4,885,131.

[51] Int. Cl.$^5$ ............................................. C04G 35/02
[52] U.S. Cl. ..................................... 501/93; 501/87; 501/96; 501/98
[58] Field of Search ...................... 419/12, 17; 501/87, 501/93, 96, 98

[56] References Cited

U.S. PATENT DOCUMENTS

| | | | |
|---|---|---|---|
| 3,758,662 | 9/1973 | Tobin | 264/332 |
| 3,864,154 | 2/1975 | Gazza et al. | 29/123 B |
| 4,471,059 | 9/1984 | Yoshino et al. | 501/96 |
| 4,492,670 | 1/1985 | Mizrah et al. | 419/12 |
| 4,544,524 | 10/1985 | Mizrah et al. | 419/12 |
| 4,585,618 | 4/1986 | Fresnel et al. | 419/12 |
| 4,595,595 | 1/1986 | Sane | 264/65 |
| 4,605,440 | 8/1986 | Halverson | 75/238 |
| 4,606,768 | 8/1986 | Svilar et al. | 75/244 X |
| 4,692,418 | 8/1987 | Boecker et al. | 501/90 |
| 4,702,770 | 10/1987 | Pyzik | 75/236 |
| 4,713,360 | 12/1987 | Newkirk et al. | 501/87 |
| 4,718,941 | 1/1988 | Halverson | 75/236 |
| 4,777,014 | 10/1988 | Newkirk et al. | 419/12 |
| 4,885,130 | 12/1989 | Claar et al. | 419/12 |
| 4,885,131 | 12/1989 | Newkirk | 419/12 |

FOREIGN PATENT DOCUMENTS

| | | |
|---|---|---|
| 0165707 | 12/1985 | European Pat. Off. . |
| 0193292 | 9/1986 | European Pat. Off. . |
| 0239520 | 9/1987 | European Pat. Off. . |
| 1492477 | 11/1977 | United Kingdom . |

*Primary Examiner*—Stephen J. Lechert, Jr.
*Attorney, Agent, or Firm*—Mark G. Mortenson; Michael K. Boyer

[57] ABSTRACT

Self-supporting bodies are produced by reactive infiltration of a parent metal into a boron donor material and a carbon donor material. The reactive infiltration typically results in a composite comprising a boron-containing compound, a carbon-containing compound and residual metal, if desired. The mass to be infiltrated may contain one or more inert fillers admixed with the boron donor material and carbon donor material. The relative amounts of reactants and process conditions may be altered or controlled to yield a body containing varying volume percents of ceramic, metal, ratios of one ceramic to another and porosity.

7 Claims, 2 Drawing Sheets

PROCESS FOR PREPARING SELF-SUPPORTING BODIES AND PRODUCTS PRODUCED THEREBY

This is a continuation of copending application(s) Ser. No. 07/296,773 filed on Jan. 13, 1989 which is now allowed U.S. Pat. No. 4,885,131.

FIELD OF THE INVENTION

This invention relates generally to a novel method of preparing self-supporting bodies and the novel products made thereby. In its more specific aspects, this invention relates to a method of producing self-supporting bodies comprising one or more boron-containing compounds, e.g., a boride or a boride and a carbide, by reactive infiltration of a molten parent metal into a bed or mass containing a boron donor material (i.e., a boron-containing material) and a carbon donor material (i.e., a carbon-containing material) and, optionally, one or more inert fillers, to form the body.

BACKGROUND OF THE PRESENT INVENTION

In recent years, there has been an increasing interest in the use of ceramics for structural applications historically served by metals. The impetus for this interest has been the superiority of ceramics with respect to certain properties, such as corrosion resistance, hardness, wear resistance, modulus of elasticity, and refractory capabilities when compared with metals.

However, a major limitation on the use of ceramics for such purposes is the feasibility and cost of producing the desired ceramic structures. For example, the production of ceramic boride bodies by the methods of hot pressing, reaction sintering and reaction hot pressing is well known. In the case of hot pressing, fine powder particles of the desired boride are compacted at high temperatures and pressures. Reaction hot pressing involves, for example, compacting at elevated temperatures and pressures boron or a metal boride with a suitable metal-containing powder. U.S. Pat. No. 3,937,619 to Clougherty describes the preparation of a boride body by hot pressing a mixture of powdered metal with a powdered diboride, and U.S. Pat. No. 4,512,946 to Brun describes hot pressing ceramic powder with boron and a metal hydride to form a boride composite.

However, these hot pressing methods require special handling and expensive special equipment, they are limited as to the size and shape of the ceramic part produced, and they typically involve low process productivities and high manufacturing cost.

A second major limitation on the use of ceramics for structural applications is their general lack of toughness (i.e. damage tolerance or resistance to fracture). This characteristic tends to result in sudden, easily induced, catastrophic failure of ceramics in applications involving even rather moderate tensile stresses. This lack of toughness tends to be particularly common in monolithic ceramic boride bodies.

One approach to overcome this problem has been to attempt to use ceramics in combination with metals, for example, as cermets or metal matrix composites. The objective of this approach is to obtain a combination of the best properties of the ceramic (e.g. hardness and/or stiffness) and the metal (e.g. ductility). U.S. Pat. No. 4,585,618 to Fresnel, et al., discloses a method of producing a cermet whereby a bulk reaction mixture of particulate reactants, which react to produce a sintered self-sustaining ceramic body, is reacted while in contact with a molten metal. The molten metal infiltrates at least a portion of the resulting ceramic body. Exemplary of such a reaction mixture is one containing titanium, aluminum and boron oxide (all in particulate form), which is heated while in contact with a pool of molten aluminum. The reaction mixture reacts to form titanium diboride and alumina as the ceramic phase, which is infiltrated by the molten aluminum. Thus, this method uses the aluminum in the reaction mixture principally as a reducing agent. Further, the external pool of molten aluminum is not being used as a source of precursor metal for a boride forming reaction, but rather it is being utilized as a means to fill the pores in the resulting ceramic structure. This creates cermets which are wettable and resistant to molten aluminum. These cermets are particularly useful in aluminum production cells as components which contact the molten aluminum produced but preferably remain out of contact with the molten cryolite. There is further no employment of boron carbide in this process.

European Application 0,113,249 to Reeve, et al. discloses a method for making a cermet by first forming in situ dispersed particles of a ceramic phase in a molten metal phase, and then maintaining this molten condition for a time sufficient to effect formation of an intergrown ceramic network. Formation of the ceramic phase is illustrated by reacting a titanium salt with a boron salt in a molten metal such as aluminum. A ceramic boride is developed in situ and becomes an intergrown network. There is, however, no infiltration, and further the boride is formed as a precipitate in the molten metal. Both examples in the application expressly state that no grains were formed of $TiAl_3$, $AlB_2$, or $AlB_{12}$, but rather $TiB_2$ is formed demonstrating the fact that the aluminum is not the metal precursor to the boride. There is further no suggestion of using boron carbide as a precursor material in the process.

U.S. Pat. No. 3,864,154 to Gazza, et al. discloses a ceramic-metal system produced by infiltration. An A compact was impregnated with molten aluminum under vacuum to yield a system of these components. Other materials prepared included $SiB_6$-Al, B-Al; $B_4C$-Al/Si; and $AlB_{12}$-B-Al. There is no suggestion whatsoever of a reaction, and no suggestion of making composites involving a reaction with the infiltrating metal nor of any reaction product embedding an inert filler or being part of a composite.

U.S. Pat. No. 4,605,440 to Halverson, et al., discloses that in order to obtain $B_4C$-Al composites, a $B_4C$-Al compact (formed by cold pressing a homogeneous mixture of $B_4C$ and Al powders) is subjected to sintering in either a vacuum or an argon atmosphere. There is no infiltration of molten metal from a pool or body of molten precursor metal into a preform. Further, there is no mention of a reaction product embedding an inert filler in order to obtain composites utilizing the favorable properties of the filler.

While these concepts for producing cermet materials have in some cases produced promising results, there is a general need for more effective and economical methods to prepare boride-containing materials.

DISCUSSION OF RELATED PATENT APPLICATIONS

Many of the above-discussed problems associated with the production of boride-containing materials have been addressed in co-pending U.S. Patent Application Ser. No. 073,533, filed in the names of Danny R. White, Michael K. Aghajanian and T. Dennis Claar, on July 15, 1987, and entitled "Process for Preparing Self-Supporting Bodies and Products Made Thereby".

Briefly summarizing the disclosure of Application '533, self-supporting ceramic bodies are produced by utilizing a parent metal infiltration and reaction process (i.e., reactive infiltration) in the presence of a boron carbide. Particularly, a bed or mass of boron carbide is infiltrated by molten parent metal, and the bed may be comprised entirely of boron carbide, thus resulting in a self-supporting body comprising one or more parent metal boron-containing compounds, which compounds include a parent metal boride or a parent metal boro carbide, or both, and typically also may include a parent metal carbide. It is also disclosed that the mass of boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of Application '533, a mass comprising boron carbide is placed adjacent to or in contact with a body of molten metal or metal alloy, which is melted in a substantially inert environment within a particular temperature envelope. The molten metal infiltrates the boron carbide mass and reacts with the boron carbide to form at least one reaction product. The boron carbide is reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted boron carbide by a wicking or a capillary action. This transported metal forms additional parent metal, boride, carbide, and/or boro carbide and the formation or development of a ceramic body is continued until either the parent metal or boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in Application '533, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the boron carbide body, the relative amounts of boron carbide and parent metal, alloys of the parent metal, dilution of the boron carbide with a filler, temperature, and time. Preferably, conversion of the boron carbide to the parent metal boride, parent metal boro compound(s) and parent metal carbide is at least about 50%, and most preferably at least about 90%.

The typical environment or atmosphere which was utilized in Application '533 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Copending U.S. Patent application Ser. No. 137,044 (hereinafter referred to as "Application '044"), filed in the names of Terry Dennis Claar, Steven Michael Mason, Kevin Peter Pochopien and Danny Ray White, on Dec. 23, 1987, and entitled "Process for Preparing Self-Supporting Bodies and Products Made Thereby", is a continuation-in-part application of Application '533. Application '044 discloses that in some cases it may be desirable to add a carbon donor material (i.e., a carbon-containing compound) to the bed or mass of boron carbide which is to be infiltrated by molten parent metal. Specifically, it was disclosed that the carbon donor material could be capable of reacting with the parent metal to form a parent metal-carbide phase which could modify resultant mechanical properties of the composite body, relative to a composite body which was produced without the use of a carbon donor material. Accordingly, it was disclosed that reactant concentrations and process conditions could be altered or controlled to yield a body containing varying volume percents of ceramic compounds, metal and/or porosity. For example, by adding a carbon donor material (e.g., graphite powder or carbon black) to the mass of boron carbide, the ratio of parent metal-boride/parent metal-carbide could be adjusted. In particular, if zirconium was used as the parent metal, the ratio of $ZrB_2/ZrC$ could be reduced (i.e., more ZrC could be produced due to the addition of a carbon donor material in the mass of boron carbide).

Application '044 also discloses the use of a graphite mold which contains an appropriate number of through-holes having a particular size, shape and location which function as a venting means to permit the removal of, for example, any gas which may be trapped in the preform or filler material as the parent metal reactive infiltration front infiltrates the preform.

In another related application, specifically, Copending U.S. Patent application Ser. No. 137,382 which issued on Dec. 23, 1987, as U.S. Pat. No. 4,915,736, (hereinafter referred to as Patent '736", filed in the names Terry Dennis Claar and Gerhard Hans Schiroky, on Dec. 23, 1987, and entitled "A Method of Modifying Ceramic Composite Bodies By a Carburization Process and Articles Made Thereby" additional modification techniques are disclosed. Specifically, Patent '736 discloses that a ceramic composite body made in accordance with the teachings of Application '533 can be modified by exposing the composite to a gaseous carburizing species. Such a gaseous carburizing species can be produced by, for example, embedding the composite body in a graphitic bedding and reacting at least a portion of the graphitic bedding with moisture or oxygen in a controlled atmosphere furnace. However, the furnace atmosphere should comprise typically, primarily, a nonreactive gas such as argon. It is not clear whether impurities present in the argon gas supply the necessary $O_2$ for forming a carburizing species, or whether the argon gas merely serves as a vehicle which contains impurities generated by some type of volatilization of components in the graphitic bedding or in the composite body. In addition, a gaseous carburizing species could be introduced directly into a controlled atmosphere furnace during heating of the composite body.

Once the gaseous carburizing species has been introduced into the controlled atmosphere furnace, the setup should be designed in such a manner to permit the carburizing species to be able to contact at least a portion of the surface of the composite body buried in the loosely packed graphitic powder. It is believed that carbon in the carburizing species, or carbon from the graphitic bedding, will dissolve into the interconnected zirconium carbide phase, which can then transport the dissolved carbon throughout substantially all of the body, if desired, by a vacancy diffusion process. Moreover Patent '736 discloses that by controlling the time, the exposure of the composite body to the carburizing species and/or the temperature at which the carburization process occurs, a carburized zone or layer can be formed on o the surface of the composite body. Such process could result in a hard, wear-resistant surface surrounding a core of composite material having a higher metal content and higher fracture toughness.

Thus, if a composite body was formed having a residual parent metal phase in the amount of between about 5-30 volume percent, such composite body could be modified by a post carburization treatment to result in from about 0 to about 2 volume percent, typically about ½ to about 2 volume percent, of parent metal remaining in the composite body.

The disclosures of each of the above-discussed Commonly Owned U.S. Applications are herein expressly incorporated by reference.

SUMMARY OF THE INVENTION

In accordance with the present invention, self-supporting ceramic bodies are produced utilizing a parent metal infiltration and reaction process (i.e. reactive infiltration) in the presence of a boron donor material and a carbon donor material. A bed or mass of a boron donor material and a carbon donor material is infiltrated by molten parent metal resulting in a self-supporting body comprising one or more parent metal boron-containing compounds, which compounds include a parent metal boride or a parent metal boro carbide, or both, and typically also may include a o parent metal carbide. Alternatively, the mass to be infiltrated may contain one or more inert fillers admixed with the boron donor material and carbon donor material to produce a composite by reactive infiltration, which composite comprises a matrix of one or more boron-containing compounds and also may include a parent metal carbide. In both embodiments, the final product may include a metal as one or more metallic constituents of the parent metal.

The reactant concentrations and process conditions may be altered or controlled to yield a body containing varying volume percents of ceramic compounds, metal and/or porosity. Specifically, the amount of parent metal carbide relative to parent metal boride which is formed during reactive infiltration controlled by selecting specific starting amounts of boron donor material and carbon donor material. In some cases it may be desirable to supply a boron donor material (i.e., a boron-containing compound) in an amount that is in excess of the stroichiometric ratio of $B_4C$ (i.e., greater than a molar ratio of 4 moles of boron to 1 mole of carbon), such boron donor material being capable of reacting with the parent metal to form a parent metal-boride phase, thereby modifying resultant mechanical properties of the composite body relative to a body containing boron and carbon in a molar ratio of 4/1. Likewise, in some cases it may be desirable to supply a carbon donor material (i.e., a carbon-containing compound) in an amount that is in excess of the stroichiometric ratio of $B_4C$ (i.e., greater than a molar ratio of 1 mole of carbon to 4 moles of boron), such excess carbon donor material being capable of reacting with the parent metal to form a parent metal carbide phase, thereby modifying resultant mechanical properties of the composite body. The reactant concentrations may be modified from an almost pure boron donor material to an almost pure carbon donor material depending upon the intended application for the final body. Moreover, the process conditions may also be altered or controlled to yield a body containing varying volume percents of ceramic compounds, metal and/or porosity. Thus, it is apparent that the amount of parent metal boride relative to parent metal carbide may be controlled to produce a variety of different materials for a wide variety of applications.

Moreover, in addition to the discussion of parent metals set forth above herein, it has been discovered that in some circumstances it may be desirable to utilize specific parent metal alloys to achieve a particular desirable result. For example, it has been discovered that a titanium/zirconium alloy produces very desirable self-supporting ceramic bodies by the above-described reactive infiltration process. Specifically, similar to that which was discussed above herein, a bed or mass comprising a boron donor material and a carbon donor material is infiltrated by a molten titanium/zirconium alloy. The particular advantages that are achieved by utilizing a titanium/zirconium alloy are that the resulting self-supporting body may have even better high temperature mechanical properties relative to a self-supporting body made with a parent metal comprising primarily zirconium. Accordingly, while either of the parent metals of titanium/zirconium may be used alone, certain advantages may be achieved when titanium is alloyed into zirconium or zirconium is alloyed into titanium in a range of from about substantially pure titanium to about substantially pure zirconium. When such a titanium/zirconium alloy reactively infiltrates a bed or mass comprising a boron donor material and a carbon donor material, the reaction products which are produced include titanium borides (e.g., $TiB_2$), zirconium borides (e.g., $ZrB_2$), titanium boro carbides and zirconium boro carbides, or a combination of the compounds, and typically may also contain titanium carbide and zirconium carbide. Still further, as discussed above, the mass to be infiltrated may contain one or more inert fillers admixed with the boron donor material and carbon donor material. In all of these embodiments, the final product may also include one or more metals, as one or more metallic constituents, of the titanium/zirconium alloy.

Broadly, in the method of this invention, a mass comprising a boron donor material and a carbon donor material, admixed in a desirable molar ratio (e.g., preferably in a ratio of B/C of from about 1/1 to about 10/1, but the admixture in some cases may approach a substantially pure boron donor material or a substantially pure carbon donor material) is placed adjacent to or contacted with a body of molten metal or metal alloy, which is melted in a substantially inert environment within a particular temperature envelope. The molten metal infiltrates the mass and reacts with each of the boron donor material and the carbon donor material to form one or more reaction products. The boron donor material is reducible, at least in part, by the molten parent metal to form the parent metal boron-containing compound, e.g. a parent metal boride and/or boro compound, under the temperature conditions of the process. Similarly, the carbon donor material is reducible, at least in part, by the molten metal to form at least one parent metal carbide phase. In certain cases a parent metal boro carbide may also be produced. At least a portion of the reaction product is maintained in contact with the metal, and molten metal is drawn or transported toward the unreacted mixture of boron donor material and carbon donor material by a wicking or capillary action. This transported metal forms additional parent metal boride, carbide, and/or boro carbide, and the formation or development of a ceramic body is continued until the parent metal or boron donor material and/or carbon donor material has been consumed, or until the reaction temperature is altered to be outside the reaction temperature envelope. The resulting structure comprises one or more of a parent metal boride, a parent metal boro compound, a parent metal carbide, a metal (which as used herein is intended to include alloys and intermetallics), or voids, or a combination thereof, and these several phases may or may not be interconnected in one or more dimensions. The final volume fractions of the boron-containing compounds (i.e. boride and boro compounds), carbon-containing compounds, and metallic phases, and the degree of interconnectivity, can be controlled by changing one or more conditions, such as the initial density and relative amounts of boron donor material and carbon donor material, components of the parent metal, use of a filler, temperature and time. Still further, the above parameters can be controlled to produce a wide range of morphological changes.

Typically, the mass of boron donor material and carbon donor material will be at least somewhat porous so as to allow for wicking the parent metal through the reaction product. Wicking occurs apparently either because any volume change on reaction does not fully close off pores through which parent metal can continue to wick, or because the reaction product remains permeable to the molten metal due to such factors as surface energy considerations which render at least some of its grain boundaries permeable to the parent metal.

In another embodiment, a composite is produced by the transport of molten parent metal into a bedding or mixture of boron donor material and carbon donor material, which have been admixed with one or more inert filler materials. In this embodiment, the mixture of boron donor material and carbon donor material is incorporated into or mixed with a suitable filler material, which then is placed adjacent to or in contact with the molten parent metal. This setup may be supported on or in a separate bed that is substantially non-wettable by and non-reactive with the molten metal under the process conditions. The molten parent metal infiltrates the boron donor material—carbon donor material—filler mixture and reacts with the boron donor material and carbon donor material to form one or more boron-containing compounds. The resulting self-supporting ceramic-metal composite typically is a dense microstructure which comprises a filler embedded by a matrix comprising boron-containing compound(s), and also may include a carbide and metal. Only a small amount of boron donor material and/or carbon donor material may be required to promote the reactive infiltration process. Thus, the resulting matrix can vary in content from one composed primarily of metallic constituents thereby exhibiting certain properties characteristic of the parent metal; to cases where a high concentration of the boron donor material and carbon donor material mixture is used in the process, thereby producing a significant boron-containing compound(s) or phase which, together with any carbon-containing compounds or phase, may dominate the properties of the body. The filler may serve to enhance the properties of the composite, lower the raw materials cost of the composite, or moderate the kinetics of the boron-containing compound(s) and/or carbon-containing compound(s) formation reactions and the associated rate of heat evolution. Moreover, the type of compounds formed are influenced by the molar ratios of the starting boron donor material and carbon donor material.

In a further embodiment, the material to be infiltrated is shaped into a preform corresponding to the geometry of the desired final composite. Subsequent reactive infiltration of the preform by the molten parent metal results in a composite having the net shape or near net shape of the preform, thereby minimizing expensive final machining and finishing operations. Moreover, to assist in reducing the amount of final machining and finishing operations, a barrier material can surround the preform. The use of a graphite mold is particularly useful as a barrier for such parent metals as zirconium, titanium, or hafnium, when used in combination with preforms made of, for example, boron carbide, boron nitride, boron and carbon. Still further, by placing an appropriate number of throughholes having a particular size and shape in the aforementioned graphite mold, the amount of porosity which typically occurs within a composite body manufactured according to the present invention, is reduced. Typically, a plurality of holes can be placed in a bottom portion of the mold, or that portion of the mold toward which reactive infiltration occurs. The holes function as a venting means which permit the removal of, for example, argon gas which has been trapped in the preform as the parent metal reactive infiltration front infiltrates the preform.

DEFINITIONS

As used in this specification and the appended claims, the terms below are defined as follows:

"Parent metal" refers to that metal, e.g. zirconium, which is the precursor for the polycrystalline oxidation reaction product, that is, the parent metal boride or other parent metal boron compound, and includes that metal as a pure or relatively pure metal, a commercially available metal having impurities and/or alloying constituents therein, and an alloy in which that metal precursor is the major constituent; and when a specific metal is mentioned as the parent metal, e.g. zirconium, the metal identified should be read with this definition in mind unless indicated otherwise, by the context.

"Parent metal boride" and "parent metal boro compounds" mean a reaction product containing boron formed upon reaction between a boron donor material and the parent metal and includes a binary compound of boron with the parent metal as well as ternary or higher order compounds.

"Parent metal carbide" means a reaction product containing carbon formed upon reaction of a carbon donor material and the parent metal.

DETAILED DESCRIPTION OF THE INVENTION AND PREFERRED EMBODIMENTS

Figure 1:
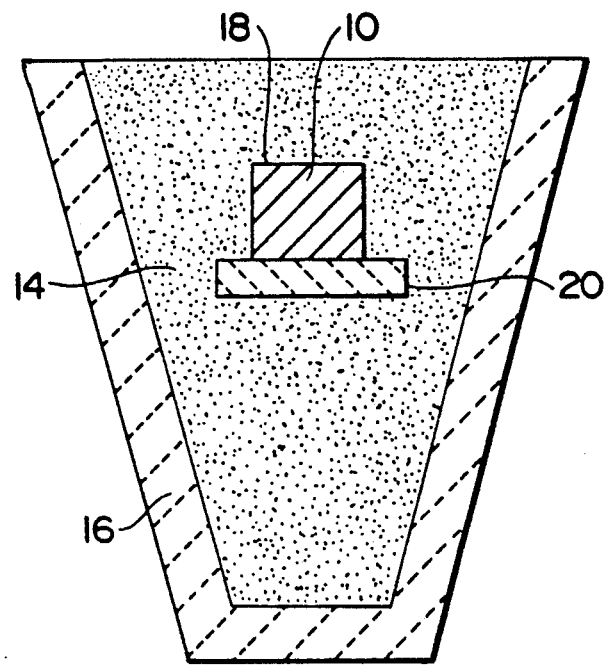
FIG. 1 is a schematic view in cross-section showing a parent metal ingot embedded in a particulate of a boron donor material and a carbon donor material within a refractory crucible, to be processed in accordance with the invention.

In accordance with the invention, a self-supporting body is produced by the reactive infiltration of a molten parent metal with boron donor material and carbon donor material to form a polycrystalline ceramic-containing body comprising the reaction product(s) of the parent metal with boron donor material and carbon donor material, and also may include one or more constituents of the parent metal. The boron donor material and carbon donor material mixture is typically a solid at the process conditions, and is preferably in a fine particulate or powdered form. The environment or atmosphere for the process is chosen to be relatively inert or nonreactive under the process conditions. Argon or vacuum, for example, would be suitable process atmospheres. The resulting product comprises one or more of (a) a parent metal boride, (b) a boro compound, (c) a parent metal carbide, and (d) metal. The constituents and proportions of such constituents formed int eh composite body depend largely on the choice and composition of parent metal, the compositions and molar ratio of the boron donor material and carbon donor material and the reaction conditions. Also, the self-supporting body produced may exhibit porosity or voids.

In the preferred embodiments of the present invention, the parent metal and a mass or bedding comprising the boron donor material and carbon donor material are positioned adjacent to each other so that reactive infiltration will be in the direction towards and into the bedding. The bedding, which may be preshaped, may include a filler material, such as a reinforcing filler, which is substantially inert under the process conditions. The reaction product can grow into the bedding without substantially disturbing or displacing it. Thus, no external forces are required which might damage or disturb the arrangement of the bedding and no awkward or costly high temperature, high pressure processes and facilities are required to create the reaction product. Reactive infiltration of the parent metal into and with the boron donor material and carbon donor material, which preferably is in particulate or powdered form, forms a composite typically comprising a parent metal boride and a parent metal boro compound. With aluminum as the parent metal, the product may comprise an aluminum boro carbide (e.g. $Al_3B_{48}C_2$, $AlB_{12}C_2$, $AlB_{24}C_4$), and also may include, e.g. aluminum, and possibly other unreacted or unoxidized constituents of the parent metal. If zirconium is the parent metal, the resulting composite comprises zirconium boride and zirconium carbide. Also, zirconium metal may be present in the composite. Alternatively, if a titanium/zirconium alloy is used as the parent metal, the resulting composite comprises titanium boride, titanium carbide, zirconium boride and zirconium carbide. Additionally, some titanium/zirconium alloy may be present in the composite as residual or nonreacted parent metal.

Although the present invention is hereinafter described with particular reference to certain preferred embodiments in which the parent metal comprises zirconium or aluminum, this is for illustrative purposes only. Other parent metals also may be used such as silicon, titanium, hafnium, lanthanum, iron, calcium, vanadium, niobium, magnesium, chromium, beryllium and titanium/zirconium alloys.

In another aspect of the invention, there is provided a self-supporting body, including composite bodies, comprising a matrix of reaction product, and, optionally metallic constituents, embedding a substantially inert filler. The matrix is formed by the reactive infiltration of a parent metal into a bed or mass of the filler intimately o mixed with boron donor material and carbon donor material. The filler material may be of any size or shape, and may be oriented with respect to the parent metal in any manner as long as the direction of development of the reaction product will be towards and will engulf at least a portion of the filler material without substantially disturbing or displacing it. The filler may be composed of or comprise any suitable material, such as ceramic and/or metal fibers, whiskers, particulates, powders, rods, wires, wire cloth, refractory cloth, plates, platelets, reticulated foam structure, solid or hollow spheres, etc. A particularly useful filler is alumina, but other oxides and ceramic fillers may be used depending on the starting materials and the end properties desired. The volume of filler material may be a loose or bonded array or arrangement, which array has interstices, openings, intervening spaces, or the like, to render the filler material permeable to the infiltration of molten parent metal. Further the filler material may be homogeneous or heterogeneous. If desired, these materials may be bonded with any suitable binding agent (e.g. Avicil PH 105, from FMC Co.) which does not interfere with the reactions of this invention or leave any undesirable residual by-products within the final composite product. A filler which would tend to react excessively with the boron donor material and carbon donor material or with the molten metal during processing may be coated so as to render the filler inert to the process environment. For example, carbon fiber, if used as a filler in conjunction with aluminum as the parent metal, will tend to react with molten aluminum, but this reaction can be avoided if the fiber is first coated, e.g. with alumina.

A suitable refractory container. holding the parent metal and a bed or volume of filler with admixed boron donor material and carbon donor material properly oriented to permit reactive infiltration of the parent metal into the filler bed and proper development of the composite, is placed in a furnace, and this lay-up is heated to a temperature above the melting point of the parent metal. At these elevated temperatures, the molten parent metal infiltrates the permeable filler by a wicking process and reacts with the boron donor material and carbon donor material, thereby producing the desired ceramic or ceramic-metal composite body. Moreover, to assist in reducing the amount of final machining and finishing operations, a barrier material can surround the preform. The use of a graphite mold is particularly useful as a barrier for such parent metals as zirconium, titanium, or hafnium, when used in combination with preforms made of, for example, boron carbide, boron nitride, boron and carbon. Still further, by placing an appropriate number of through-holes having a particular size and shape in the aforementioned graphite mold, the amount of porosity which typically occurs within a composite body manufactured according to the present invention, is reduced. Typically, a plurality of holes is placed in a bottom portion of the mold, or that portion of the mold toward which reactive infiltration occurs. The holes function as a venting means which permit the removal of, for example, argon gas which has been trapped in the preform as the parent metal reactive infiltration front infiltrates the preform.

A schematic for making a composite according to this invention is illustrated in FIG. 1. The boron donor material and carbon donor material, together with any desired inert filler materials, are fabricated into a preform with a shape corresponding to the desired geometry of the final composite. The preform 20 is superimposed with the parent metal precursor 10 and the assembly is surrounded by the inert material 14 contained within the crucible 16. The top surface 18 of the parent metal may or may not be exposed. The preform 20 may be prepared by any of a wide range of conventional ceramic body formation methods (such as uniaxial pressing, isostatic pressing, slip casting, sedimentation casting, tape casting, injection molding, filament winding for fibrous materials, etc.) depending on the characteristics of the filler. Initial bonding of the filler particles, whiskers, fibers, or the like, prior to reactive infiltration may be obtained through light sintering or by use of various organic or inorganic binder materials which do not interfere with the process or contribute undesirable by-products to the finished material. The preform 20 is manufactured to have sufficient shape integrity and green strength, and should be permeable to the transport of molten metal, preferably having a porosity of between about 5 and 90% by volume and more preferably between about 25 and 75% by volume. In the case of an aluminum parent metal, suitable filler materials include, for example, silicon carbide, titanium diboride, alumina and aluminum dodecaboride (among others), and as particulates typically having a mesh size of from about 14 to 1000, but any admixture of filler materials and mesh sizes may be used. The preform 20 is then contacted with molten parent metal on one or more of its surfaces for a time sufficient to complete infiltration of the matrix to the surface boundaries of the preform. The result of this preform method is a ceramic-metal composite body of a shape closely or exactly representing that desired in the final product, thus minimizing or eliminating expensive final machining or grinding operations.

It has been discovered that infiltration of the permeable filler by the parent metal is promoted by the presence of a boron donor material. A small amount of boron donor material has been shown to be effective, but the minimum can depend upon a number of factors such as type and particle size of the boron donor material, type of parent metal, type of filler, and process conditions. Thus, a wide variation of boron donor material concentrations can be provided in the filler, but the lower the concentration of boron donor material, the higher the volume percent of metal in the matrix. When very low amounts of the boron donor material are used, the resulting matrix may comprise interconnected metal and a limited amount of parent metal boride and parent metal carbide dispersed in the metal. In the absence of a boron donor material, reactive infiltration of the filler may, in some combinations of materials, be undesirably slow, or not occur, and infiltration may not be possible without special procedures, such as the application of external pressure to force the metal into the filler.

Because a wide range of boron donor material and carbon donor material concentrations in the filler can be used in the process of this invention, it is possible to control or to modify the properties of the completed product by varying the concentration of boron donor material and carbon donor material and/or the composition of the bed and/or the ratio of boron donor material to carbon donor material. When only a small amount of boron donor material and carbon donor material is present relative to the amount of parent metal, such that the mass comprises a low density of boron donor material and carbon donor material, the composite body or matrix properties are dominated by the properties of the parent metal, most typically ductility and toughness, because the matrix is predominately metal. Such a product may be advantageous for low or mid-range temperature applications. When a large amount of boron donor material and carbon donor material is used, as for example particles being densely packed around a filler material or occupying a high percentage of space between constituents of the filler, the resulting body or matrix properties tend to be dominated by the parent metal boride and any parent metal carbide, in that the body or matrix would be harder or less ductile or less tough. If the stoichiometry is closely controlled so as to achieve substantially complete conversion of the parent metal, the resulting product will contain little or no metal, which may be advantageous for high temperature applications of the product. Also, the substantially complete conversion of the parent metal could be significant especially in some high temperature applications, because the boride reaction product is more stable than boron carbide in that boron carbide will tend to react with residual or unoxidized metal, e.g. aluminum, present in the product.

Additional variations in the characteristics and properties of the composite can be created by controlling the infiltration conditions. Variables which can be manipulated include the nature and size of the particles of the boron donor material and carbon donor material, and the temperature and time of infiltration. For example, reactive infiltration involving large particles of boron donor material and carbon donor material and minimum exposure times at low temperatures will result in a partial conversion of the boron donor material and carbon donor material to parent metal boron and parent metal carbon compound(s). As a consequence, unreacted boron donor material and carbon donor material remains in the microstructure, which may impart desirable properties to the finished material for some purposes. Infiltration involving the boron donor material and carbon donor material particles, high temperatures and prolonged exposure times (perhaps even to hold at temperature after infiltration is complete) will tend to favor substantially complete conversion of the parent metal to the parent metal boride and carbon compound(s). Preferably, conversion of the boron donor material and carbon donor material to the parent metal boride, parent metal boro compound(s) and parent metal carbide is at least about 50%, and most preferably at least about 90%. Infiltration at high temperatures (or a subsequent high temperature treatment) also may result in densification of some of the composite constituents by a sintering process. In addition, as noted previously, the reduction of the amount of available parent metal below that necessary to form the boron and carbon compound(s) and fill the resulting interstices in the material may result in a porous body which also could have useful applications. In such a composite, porosity may vary from about 1 to 25 volume percent, and sometimes higher, depending upon the several factors or conditions enumerated above.

The following Example illustrates the novel reaction products of this invention and the method by which they are prepared; however, this Example is illustrative only and it is not intended to limit the invention claimed.

EXAMPLE 1

Figure 2:
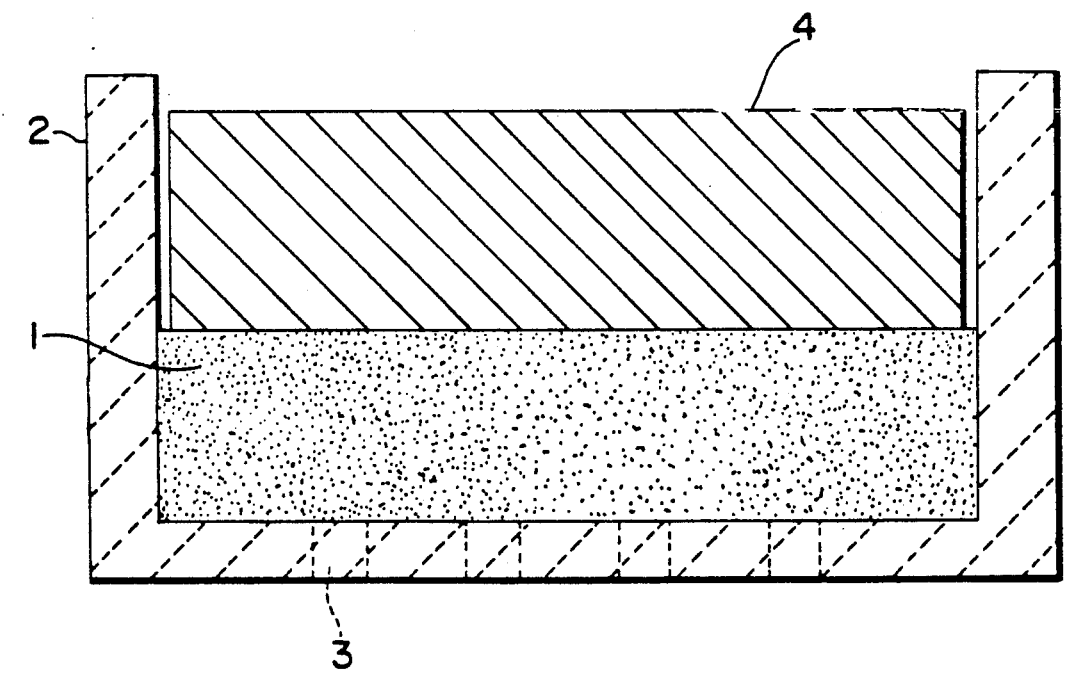
FIG. 2 is a schematic view in cross-section of the assembly used according to Example 1.

As shown in FIG. 2, a preform (1) comprising boron and carbon in a molar ratio of about 4:1 was prepared by mixing boron supplied by Consolidated Astronautics with Carbon Black from Union Carbide, sold under the trade name of UP-991, and with about 5 percent by weight Acrawax-C from Lonza, Inc. The boron, carbon black, and Acrawax were milled together. This mixture was dry pressed at a pressure of about 200 psi. The preform (1), measuring about 2 inches by 2 inches by about 0.275 inches in thickness, weighed about 26.77 grams and had a density of about 1.48 grams/centimeter$^3$.

A graphite crucible (2) measuring about 2 inches by 2 inches by 2 inches and comprised of 2020 grade graphite (from Graphite Engineering) was prepared by roughening with sand paper and by creating 16 approximately 1/16 inch diameter holes (3) placed in the bottom of the crucible. The above-described preform (1) was placed into the graphite crucible (2).

The graphite crucible (2) containing the preform (1) was placed into a retort furnace which was evacuated and backfilled with argon three times. The furnace was heated from room temperature up to about 250° C. in about 30 minutes. During heating, argon was passed through the retort furnace at a rate of 500 cc/minute. The temperature was increased from about 250° C. to about 550° C. at a rate of about 50° C./hour This temperature was maintained for about 2 hours. The furnace was cooled to room temperature.

A 702 grade zirconium alloy (4) measuring about 2 inches by about 2 inches by 0.5 inches and weighing about 223 grams was placed directly upon the preform in the graphite crucible (2). The graphite crucible (2) containing the zirconium alloy (3) on the preform (1) was placed into an AVS furnace.

The AVS furnace was evacuated and backfilled with argon twice to ensure a pure argon atmosphere in the furnace. During the subsequent heating steps, argon was passed through the furnace at a rate of about 500 cc/minute, resulting in a pressure within the AVS furnace of about 1 psi. The temperature was increased from room temperature to about 950° C. in about 6 hours. This temperature was maintained for about 2 hours, then the furnace was permitted to cool to room temperature.

The graphite boat (2) was removed from the AVS furnace and inspected. It was discovered that the zirconium alloy (4) had reactively infiltrated into the preform (1) comprising carbon and boron to form a body comprising zirconium boride, and zirconium carbide, and zirconium metal.

Figure 3:
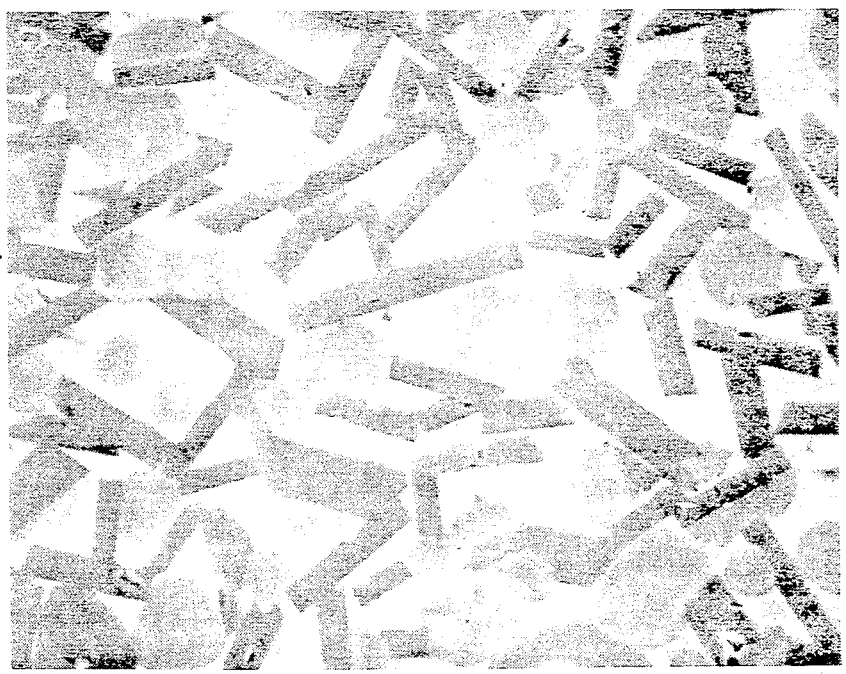
FIG. 3 is a photomicrograph taken at 400X of a body produced according to Example 1.

FIG. 3 is a photomicrograph taken at 400X of a section of the composite formed according to Example 1.

What is claimed is:

1. A method for producing a self-supporting body, comprising:
   selecting a parent metal;
   heating said parent metal in a substantially inert atmosphere to a temperature above its melting point to form a body of molten parent metal;
   contacting said body of molten parent metal with a preform comprising a boron donor material and a carbon donor material;
   maintaining said temperature for a time sufficient to permit infiltration of molten parent metal into said preform and to permit reaction of said molten parent metal with at least a portion of said preform; and
   continuing said infiltration and reaction for a time sufficient to produce said self-supporting body.

2. The method according to claim 1, wherein said parent metal comprises at least one metal selected from the group consisting of silicon, titanium, zirconium, hafnium, iron, calcium, vanadium, magnesium, beryllium, chromium, aluminum and niobium.

3. The method according to claim 1, further comprising controlling the ratio of boron donor material to carbon donor material.

4. The method according to claim 1, further comprising providing a barrier material to at least a portion of said preform.

5. The method according to claim 1, wherein said preform further comprises a filler material.

6. The method according to claim 5, wherein said filler material comprises at least one material selected from the group consisting of fibers, whiskers, particulates, rods, wires, cloth, platelets, foams, and hollow spheres.

7. The method according to claim 1, wherein said parent metal comprises an alloy of titanium and zirconium.

* * * * *

UNITED STATES PATENT AND TRADEMARK OFFICE
CERTIFICATE OF CORRECTION

PATENT NO. : 5,010,044

DATED : April 23, 1991

INVENTOR(S) : Marc Stevens Newkirk

It is certified that error appears in the above-identified patent and that said Letters Patent is hereby corrected as shown below:

Column 1, line 7: delete "allowed".

Column 2, line 39: delete "An".

Column 3, line 24: change "product" to --produced--;
line 46: delete "," after "metal".

Column 4, line 64: after "Thereby" insert --,--.

Column 5, line 31: change "on o the" to --on the--;
line 57: change "a o parent" to --a parent--.

Column 6, line 4: after "infiltration" insert --is--;
line 9: change "stroichiometric" to --stoichiometric--;
line 18: change "stroichiometric" to --stoichiometric--.

Column 9, line 46: change "int eh" to --in the--.

Column 10, line 31: change "o mixed" to --mixed--.

Column 12, line 32: change "predominately" to --predominantly--.

UNITED STATES PATENT AND TRADEMARK OFFICE
CERTIFICATE OF CORRECTION

PATENT NO. : 5,010,044
DATED : April 23, 1991
INVENTOR(S) : Marc Stevens Newkirk It is certified that error appears in the above-indentified patent and that said Letters Patent is hereby corrected as shown below:

Column 13, line 5, change "carbon" to --carbeide-- line 55, change "hour This" to --hour. This--

Column 14, line 10, change "950°C" to --1950°C--.

Signed and Sealed this

Sixteenth Day of November, 1993

*Attest:*

BRUCE LEHMAN

*Attesting Officer*     Commissioner of Patents and Trademarks